United States Patent

[11] 3,607,025

| [72] | Inventor | Howard W. Jacobson<br>Wilmington, Del. |
|---|---|---|
| [21] | Appl. No. | 724,178 |
| [22] | Filed | Apr. 25, 1968 |
| [45] | Patented | Sept. 21, 1971 |
| [73] | Assignee | E. I. du Pont de Nemours and Company<br>Wilmington, Del. |

[54] SILICA-DEFICIENT MULLITE FIBER AND A PROCESS FOR ITS PRODUCTION
5 Claims, 4 Drawing Figs.

[52] U.S. Cl. ..................................................... 23/110, 106/65, 106/69
[51] Int. Cl. ..................................................... C01b 33/26
[50] Field of Search ............................................ 23/110; 106/69, 65

[56] References Cited
UNITED STATES PATENTS

| 2,389,352 | 11/1945 | Fisher.......................... | 23/110 |
| 2,678,282 | 5/1954 | Jones............................ | 23/110 X |
| 3,023,115 | 2/1962 | Wainer et al. ................. | 106/69 X |
| 3,073,770 | 1/1963 | Sinclair et al. ................ | 204/192 |
| 3,104,943 | 9/1963 | Berry............................ | 23/110 |
| 3,321,271 | 5/1967 | Johnson et al. ............... | 23/110 |
| 3,366,445 | 1/1968 | Einstein et al. ............... | 23/110 |

*Primary Examiner*—Edward Stern
*Attorney*—Frank R. Ortolani

ABSTRACT: Silica-deficient mullite fibers of 82% to 99.9% $Al_2O_3$ and 0.1% to 18% $SiO_2$ are produced by intimately contacting an alkali metal halide and aluminum trichloride with a silica source in the presence of a moist oxidizing gas at a temperature of from about 1,000° C. to 1,350° C. for at least 10 minutes. The silica-deficient mullite fibers are single crystals exhibiting the X-ray pattern of mullite.

1μ

⊢–⊣
1μ

⊢–⊣
100μ

INVENTOR
HOWARD W. JACOBSON
BY Carl A. Hechmer
ATTORNEY

3,607,025

SILICA-DEFICIENT MULLITE FIBER AND A PROCESS FOR ITS PRODUCTION

BACKGROUND OF THE INVENTION

Because of its chemical stability, particularly at high temperatures, alumina in various forms has been found to be a very valuable commercial product. Alumina in small particle size is widely used to great advantage as a strengthening material in metal, these products being the well-known dispersion-strengthened metals. When a chemically stable material such as alumina can be obtained in single crystal form, the strength can be up to 15 times greater than the polycrystalline form. When single crystals of chemically-stable materials can be obtained in forms such that the length-to-diameter ratio is high, still other advantages are achieved.

Alumina chemically combined with 28.2 % by weight silica in the general formula $3Al_2O_3 \cdot 2SiO_2$ forms a composition known as mullite. These compounds, exhibiting a characteristic X-ray diffraction pattern, have many of the valuable properties of alumina and, in addition, other valuable physical and chemical properties. For the purposes of this application, silica-deficient mullite will be defined as $Al_2O_3$ in chemical combination with from about 0.1% to about 18% silica, and showing the X-ray diffraction pattern of mullite. Total charge will be defined as all components added to the reactor and will not include silica surfaces which may enter into the reaction.

Various methods have been suggested in the prior art for the production of mullite in fibrous form. For example, U.S. Pat. No. 3,104,943 discloses methods whereby mullite fibers of less than 5 microns in cross-sectional diameter and an axial ratio of at least 100:1 are produced. The process is a vapor-phase reaction at a temperature of from 800° C. to 1,200° C. in which silicon dioxide, aluminum, and aluminum combined with a source of sulfur are reacted in an atmosphere containing at least 1% hydrogen.

U.S. Pat. No. 3,023,115 discloses a process for the production of a composition of matter, in the form of discrete fibers, consisting essentially of between 95% and 99% by weight alumina and 1-5% by weight silica. The process of this invention comprises reacting a gaseous suboxide of aluminum with silicon monoxide vapors in a hydrogen atmosphere at a temperature of from about 1,370° C. to about 1,500° C.

U.S. Pat. No. 3,321,271 discloses a process for production of aluminum silicate whiskers in a vapor state reaction carried out at a temperature of from 1,000° C. to 1,400° C.

SUMMARY OF THE INVENTION

In accordance with the present invention, a process is provided in which at least one alkali metal halide and aluminum trichloride is intimately contacted with a source of silica in the presence of an oxidizing gas, which may be elemental oxygen, air, or $NO_2$, at a temperature of 1,000° C. to 1,350° C. for at least ten minutes. The product resulting from this reaction is a silica-deficient mullite fiber in single crystal form exhibiting the X-ray diffraction pattern of mullite, and containing 0.1% to 18% by weight of $SiO_2$.

BRIEF DESCRIPTION OF THE DRAWINGS

The invention can be further understood by reference to the drawings in which.

EXAMPLES

To illustrate more completely the invention, the following examples are given. KCl are for purposes of illustration only and are not to be constructed as limitations of the invention.

Example 1

Figure 1:
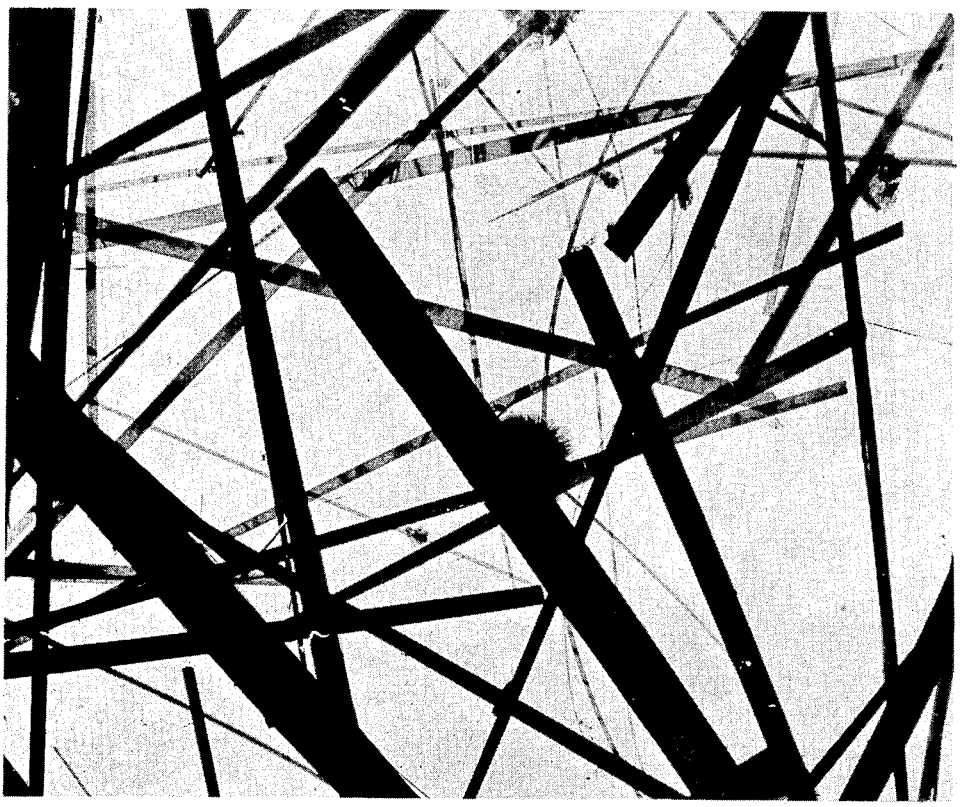
FIG. 1 is a photomicrograph of fibers of the invention.

A salt charge is prepared by mixing 454 g. KCl and 114 g. anhydrous $AlCl_3$ for 5 minutes in a jar on a rolling mill. The ingredients are then placed in a silica test tube reactor, (Vycor tube) 45.72 cm. long and 6.4 cm. in diameter. The tube is fitted with an inlet tube for the introduction of a blanket of oxidizing gas and an exit tube for the discharge of the gaseous product of the reaction. A vertical furnace is heated to 1,100° C. and the reactor tube containing the salt charge is placed therein so that about 6 inches of the tube extends above the furnace line. The reaction is allowed to continue for four hours after which $NO_2$ is observed in the exit gas. The reactor is removed from the furnace and mullite fibers are found throughout the solidified charge. The fibers are obtained from the solidified melt by leaching with water or dilute acid. The product (82% yield based on the $AlCl_3$ in the charge) has a cross sectional diameter of 1–2 microns, a length to diameter ratio of about 20:1, exhibits the X-ray pattern of mullite exclusively, and contains 1% $SiO_2$ and 99% $Al_2O_3$. FIG. 1 is a photomicrograph of fibers produced by the process of this example.

Example 2

Figure 2:
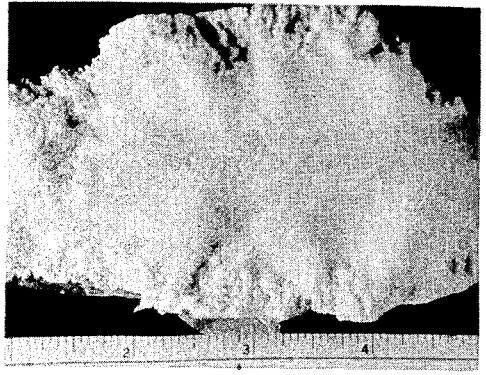
FIGS. 2 and 3 are photomicrographs of solidified salt melt containing the fibers of the invention.
Figure 3:
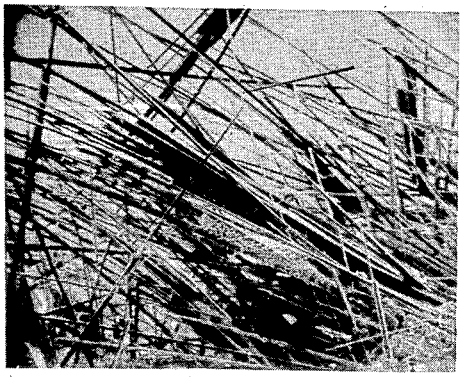
Figure 4:
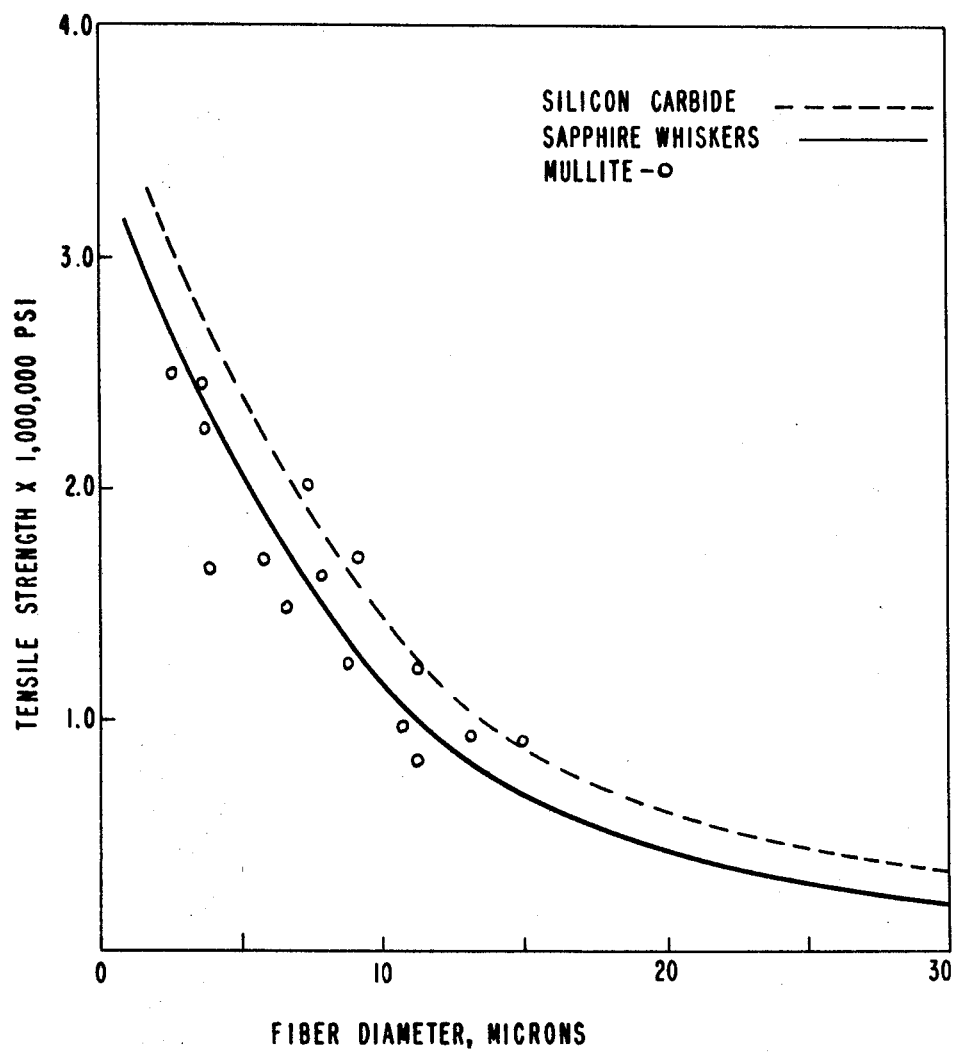
FIG. 4 is a graph in which fiber diameters of the products of this invention and of other high tensile fibers are plotted on the abscissa against tensile strength in millions of pounds per square inch on the ordinate.

A charge of 225 g. KCl, and 175 g. NaCl, 114 g. $AlCl_3$, 50 g. $Na_3AlF_6$ and 3 g. $KAlSi_3O_8$ are mixed by rolling in a jar for five minutes and placed in a reaction tube as described in example 1. The tube is heated to 1,200° C. and an oxidizing gas of $NO_2$ with a trace of water vapor is introduced and allowed to react for 20 hours. At the conclusion of this time, chlorine in the exit gas reaches a value below $1 \times 10^{12}$ grams per minute. The reaction is terminated and the fibrous mullite is recovered as in example 1. The product (75% yield based on $AlCl_3$) has a diameter of 1–15 microns, a length to diameter ratio of from 50:1, exhibits the X-ray diffraction pattern of mullite, and contains 94% $Al_2O_3$ and 6% $SiO_2$. FIG. 2 shows a photomicrograph of a solidified salt melt of the process of this example. FIG. 3 is a photomicrograph of the fibers of the example in the solidified melt. Tensile strength measurements on randomly selected fibers are shown in FIG. 4. For purposes of comparison similar test data are included for two single crystal materials of exceptionally high strength, silicon carbide and sapphire whiskers, indicated by broken and solid lines respectively. The curve for mullite on the graph exhibits the characteristic shape of single crystal fibers such as silicon carbide and sapphire whiskers (increase in tensile strength with a decrease in fiber diameter). The fibers produced by this example are leached in concentrated hydrofluoric acid at a temperature of 50° C. for one hour. The $SiO_2$ content of the fiber is found to be essentially unchanged by the leaching and the tensile strength is also unchanged. The diameter of the fibers is found to be decreased uniformly but the X-ray pattern of mullite is still exhibited.

Example 3

The process of example 2 is repeated except that oxygen containing a small amount of water vapor is used as the oxidizing gas. The results are almost identical with those of example 2. The example is repeated using 20 g. of $KAlSi_3O_8$ and a mullite product containing 18% silica is obtained.

Example 4

A charge of 454 g. of KCl-NaCl in eutectic proportions, 114 g. of $AlCl_3$, 50 g. of $Na_3AlF_6$, and 3 g. $KAlSi_3O_8$ is mixed, placed in a silica tray 2.4 cms. ×2.54 cms. and inserted into a muffle furnace at 1,300° C. Oxygen containing a small amount of water vapor is introduced into the furnace over the surface of the tray and the reaction is allowed to proceed for 2 hours. The tray is then removed from the furnace and the mullite fibers are recovered as in example 1. The product (45% yield based on $AlCl_3$) is found to contain 6.3% $SiO_2$, has the mullite X-ray diffraction pattern, and has a diameter of from 0.5 to 5 microns.

A sample of the mullite fibers is leached in 30% HF solution at room temperature for 35 minutes. The sample is then found to contain 6.2% $SiO_2$ with a diameter of from 0.25 to 4 microns. The surface of the filter is very smooth after leaching.

Examples 5-10

In a similar manner to that described in examples 1, 2 and 3, the following experiments are carried out using a reactor tube as described in example 1. In each case 114 g. of $AlCl_3$ was used in the charge. In the case where the oxidization gas is moist oxygen (example 10), the reaction is carried out until the chlorine in the exit gas is less than $1 \times 10^{12}$ g./min. In cases where moist $NO_2$ is used as the oxidizing gas (examples 5-9), the run is carried out until the exit gas is seen to be predominantly $NO_2$. The reaction time of examples 5-7 is 4 hours while for examples 8-10, the reaction time is 20 hours. The reaction temperature of examples 5 and 6 is 1,140° C., of example 7 is 1,150° C., and of examples 8-10 is 1,200° C. The results are tabulated below.

| Example | Alkali metal halide | Fluoride source | Silica source | Product characterization |
|---|---|---|---|---|
| 5 | 454 g. KCl | None | 5 g. silica flour | Fair yield of good fibers. |
| 6 | 302 g. KCl | do. | 30 g. $SiO_2$, 14 g. Si | Long fibers. |
| 7 | 227 g. KCl / 227 g. NaCl | do. | 2 g. $SiO_2$ flour. | Very good fibers. |
| 8 | 454 g. KCl | 50 g. $NaAlF_6$ | Reactor tube | Long fibers.[1] |
| 9 | 225 g. KCl / 175 g. NaCl | 50 g. $NaAlF_6$ | 2 g. $SiO_2$ | Very good needles [1] ($NO_2$ flow doubled 1st hour). |
| 10 | 225 g. KCl / 175 g. NaCl | 25 g. $Na_2SiF_6$ / 50 g. NaF | 5 g. silica wool | Very excellent fibers. |

[1] As the reaction nears completion, the salt melt is no longer an exclusively reaction medium but also becomes a wetting medium for the solid fibers which have been formed. This causes voids to form between the fibers where some minor vapor phase transport may occur.

The mullite fibers of examples 8 through 10 have a cross-sectional diameter of from 0.05 to about 30 microns and a length to diameter ratio of from about 50:1 to about 500:1. When the fibers are leached in hydrofluoric acid, $SiO_2$ content remains essentially unchanged.

THE REACTANTS

The alkali metal halide may be sodium chloride or potassium chloride or a mixture of these alkali metal halides.

The source of silica may be a silica surface or a silica-containing compound. It is preferred that the silica source be open-structured and, therefore, more susceptible to attack. Compounds such as the zeolite series from which silica can be readily extracted have been found to be good silica sources. The preferred zeolite is an alkali metal aluminum silicate of the formula $MAlSi_3O_8$ where M is potassium or sodium. When a silica compound is used, it may be added in excess up about 50% by weight of the total charge. It is preferred that about 5% by weight of the total charge be added for the optimum fibers.

The $AlCl_3$ added in the charge, may be between about 5% and about 30% by weight based on the total charge. It is preferred that between about 18% and about 23% by weight, based on total charge, be used.

The oxidizing gas may be elemental oxygen or an oxygen-containing gas such as $NO_2$ or air. The gas may be used dry, but it is preferred that a trace amount of water vapor be present. The gas may be bubbled through the melted charge, or allowed to form an oxidizing blanket over the charge.

A preferred method of operation is to use a fluoride such as $M_3AlF_6$, MF, or $AlF_3$, M being potassium or sodium, as a component of the charge. These fluorides may be added in amounts up to 15% by weight of the total charge, but it is preferred that they be present at about 5% by weight. It is believed that these compounds continuously solubilize silica and transfer it to the growing mullite fibers.

REACTION CONDITIONS

The reaction may be run at atmospheric pressure, reduced pressure, or pressures considerably higher than atmospheric. The reaction time may vary from about 10 minutes to several hours depending upon reaction conditions of temperature and reactor geometry. It is preferred to use a reaction time of from about 10 minutes to about 4 hours.

The advantages of this invention are: single crystal fibers of chemically stable mullite consisting of 0.1% to 18% silica chemically combined with alumina are obtained by the process in a form in which they are particularly valuable as reinforcing materials for plastics and textile fibers; the reactions are carried out in a salt melt, making the process easily operable and commercially feasible; the process employs materials which are relatively inexpensive and easily obtained; a relatively high yield of fibers per unit volume of reactor results; a product of quite uniform and predictable particle dimensions and chemical composition is obtained; the product is applicable in many uses without further processing, and there is no serious problem of byproduct or waste disposal.

These and other variations and applications will become apparent to one skilled in the art upon reading this disclosure.

I claim:

1. A process for producing single crystal silica-deficient mullite fibers having a silica content of 0.1% to 18% by weight comprising: maintaining at a temperature of from about 1,000° C. to about 1,350° C. for a period of at least 10 minutes in the presence of a moistened oxidizing gas selected from the group consisting of air, $O_2$, and $NO_2$, an intimate contact of (1) a salt of at least one alkali metal halide, (2) aluminum trichloride, and (3) a source of silica; and leaching away the salt reaction medium to recover said silica-deficient mullite fibers.

2. The process of claim 1 wherein said alkali metal salt, aluminum trichloride and silica form an intimately contacted charge to a reaction vessel and said aluminum trichloride constitutes from about 5% to about 30% by weight based on the total charge, and said silica is not in excess of 50% by weight based on total charge.

3. The process of claim 2 wherein said salt melt includes (1) from about 1% to about 15% based on total charge, of a fluoride compound selected from the group consisting of MF, $M_3AlF_6$, and $AlF_3$ where M is an alkali metal selected from the group consisting of potassium and sodium, and (2) a compound of the zeolite series as said silica source.

4. The process of claim 3 wherein said alkali metal salt is NaCl and KCl in eutectic proportions, said compounds of the zeolite series is an alkali metal silicate of the formula $MAlSi_3O_8$ where M is selected from the group consisting of sodium and potassium, said aluminum trichloride present for reaction is from about 18% to about 23% by weight, based on total charge, and said oxidizing gas is $NO_2$.

5. A silica-deficient mullite fiber in single crystal form, exhibiting an X-ray pattern of mullite, consisting essentially of from about 0.1% to about 18% by weight silica and at least 82% alumina by weight and having a cross-sectional diameter of about 0.05 to about 30 microns and a length to diameter ratio of about 20:1 to 500:1, the percentage of silica in the fiber being essentially unchanged when the fiber is leached in concentrated hydrofluoric acid.